(12) United States Patent
Ito

(10) Patent No.: US 10,760,508 B2
(45) Date of Patent: Sep. 1, 2020

(54) CONTROL DEVICE FOR INTERNAL COMBUSTION ENGINE AND INTERNAL COMBUSTION ENGINE

(71) Applicant: TOYOTA JIDOSHA KABUSHIKI KAISHA, Aichi-ken (JP)

(72) Inventor: Hironori Ito, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 292 days.

(21) Appl. No.: 15/432,504

(22) Filed: Feb. 14, 2017

(65) Prior Publication Data
US 2017/0241356 A1    Aug. 24, 2017

(30) Foreign Application Priority Data

Feb. 18, 2016 (JP) .................. 2016-028979

(51) Int. Cl.
| F02D 41/00 | (2006.01) |
| F01M 13/00 | (2006.01) |
| F02D 41/12 | (2006.01) |
| F02D 41/26 | (2006.01) |
| F01M 13/02 | (2006.01) |

(52) U.S. Cl.
CPC ..... *F02D 41/0077* (2013.01); *F01M 13/0011* (2013.01); *F02D 41/0002* (2013.01); *F02D 41/0005* (2013.01); *F02D 41/0072* (2013.01); *F02D 41/12* (2013.01); *F02D 41/26* (2013.01); *F01M 2013/0044* (2013.01); *F01M 2013/026* (2013.01); *F02D 2200/703* (2013.01); *F02D 2250/08* (2013.01); *Y02T 10/42* (2013.01); *Y02T 10/47* (2013.01)

(58) Field of Classification Search
CPC ....... F01M 13/0011; F01M 2013/0044; F01M 2013/026; F02D 2200/703; F02D 2250/08; F02D 41/0002; F02D 41/0005; F02D 41/0072; F02D 41/0077; F02D 41/12; F02D 41/26; Y02T 10/42; Y02T 10/47

See application file for complete search history.

(56) References Cited

U.S. PATENT DOCUMENTS

2017/0175662 A1* 6/2017 Yoshioka ................ F02D 41/22

FOREIGN PATENT DOCUMENTS

| EP | 2128407 A1 | 12/2009 |
| JP | 2008-248729 A | 10/2008 |
| JP | 2009222008 A | 10/2009 |
| JP | 2012-007547 A | 1/2012 |
| JP | 2015-040549 A | 3/2015 |

* cited by examiner

*Primary Examiner* — Lindsay M Low
*Assistant Examiner* — Ruben Picon-Feliciano
(74) *Attorney, Agent, or Firm* — Hauptman Ham, LLP

(57) ABSTRACT

An internal combustion engine has a control device, an EGR valve that adjusts an EGR rate, a PCV valve that adjusts an opening degree of a first PCV passage that communicates an inside of a crankcase and a downstream side of a throttle valve. The control device operates the throttle valve in a closing direction in response to a deceleration request. The control device adjusts an opening degree of the PCV valve based on an immediately preceding EGR rate immediately before reception of the deceleration request.

20 Claims, 8 Drawing Sheets

CONTROL DEVICE FOR INTERNAL COMBUSTION ENGINE AND INTERNAL COMBUSTION ENGINE

CROSS-REFERENCE TO RELATED APPLICATION

This application claims priority from Japanese Patent Application No. 2016-028979 filed with the Japan Patent Office on Feb. 18, 2016, the entire contents of which are incorporated into the present specification by reference.

TECHNICAL FIELD

Embodiments of the present disclosure relates to a control device for an internal combustion engine, and particularly relates to a control device for an internal combustion engine including an EGR device that recirculates exhaust gas to an intake passage.

BACKGROUND

Patent Literature 1, for example, describes an EGR (Exhaust Gas Recirculation) control device for accurately controlling an amount of EGR gas by controlling a pressure difference before and behind an EGR control valve. More specifically, in the art, in the EGR control device including a low pressure EGR passage that recirculates exhaust gas to an intake passage from a downstream side of a DPF, and a low pressure EGR control valve provided in the low pressure EGR passage, a throttle valve provided in the intake passage or an exhaust passage is controlled so that a pressure difference in a predetermined range is formed between an upstream side and a downstream side of the low pressure EGR control valve. Thereby, a desired amount of exhaust gas is stably recirculated.

Following is a list of patent literatures which the applicant has noticed as background of the present disclosure.
Patent Literature 1: JP 2008-248729 A
Patent Literature 2: JP 2012-007547 A

SUMMARY

In one or more embodiments of the present disclosure, a control device is provided for an internal combustion engine having a cylinder, an intake passage connected to the cylinder, a throttle valve that adjusts an amount of air flowing into the cylinder through the intake passage, an EGR passage that causes exhaust gas to recirculate to the intake passage, and an EGR valve that adjusts an EGR rate, that is a ratio of exhaust gas contained in the air flowing into the cylinder by adjusting an opening degree of the EGR passage. The internal combustion engine further comprises a first PCV passage communicating an inside of a crankcase of the internal combustion engine with the intake passage at a downstream side of the throttle valve, and a PCV valve that adjusts an opening degree of the first PCV passage. The control device operates the throttle valve in a closing direction in response to a deceleration request. The control device comprises a processing circuitry including an opening degree control circuitry to adjust an opening degree of the PCV valve in a time period from reception of the deceleration request, based on an immediately preceding EGR rate, that is an EGR rate immediately before the reception of the deceleration request, when the throttle valve is operated in the closing direction in response to the deceleration request.

In one or more embodiments of the present disclosure, a control device is provided for an internal combustion engine having a cylinder, an intake passage connected to the cylinder, a throttle valve that adjusts an amount of air flowing into the cylinder through the intake passage, an EGR passage that causes exhaust gas to recirculate to the intake passage, and an EGR valve that adjusts an EGR rate, that is a ratio of exhaust gas contained in the air flowing into the cylinder by adjusting an opening degree of the EGR passage. The internal combustion engine farther comprises a first PCV passage communicating an inside of a crankcase of the internal combustion engine with the intake passage at a downstream side of the throttle valve, and a PCV valve that adjusts an opening degree of the first PCV passage. The control device operates the throttle valve in a closing direction in response to a deceleration request. The control device comprises a processing circuitry including an opening degree restriction control circuitry to restrict an opening degree of the PCV valve in a time period from reception of the deceleration request, when the PCV valve is closed immediately before the reception of the deceleration request, and the throttle valve is operated in the closing direction in response to the deceleration request.

In one or more embodiments, an internal combustion engine comprising the above described control device is provided.

DESCRIPTION OF EMBODIMENTS

Figure 1:
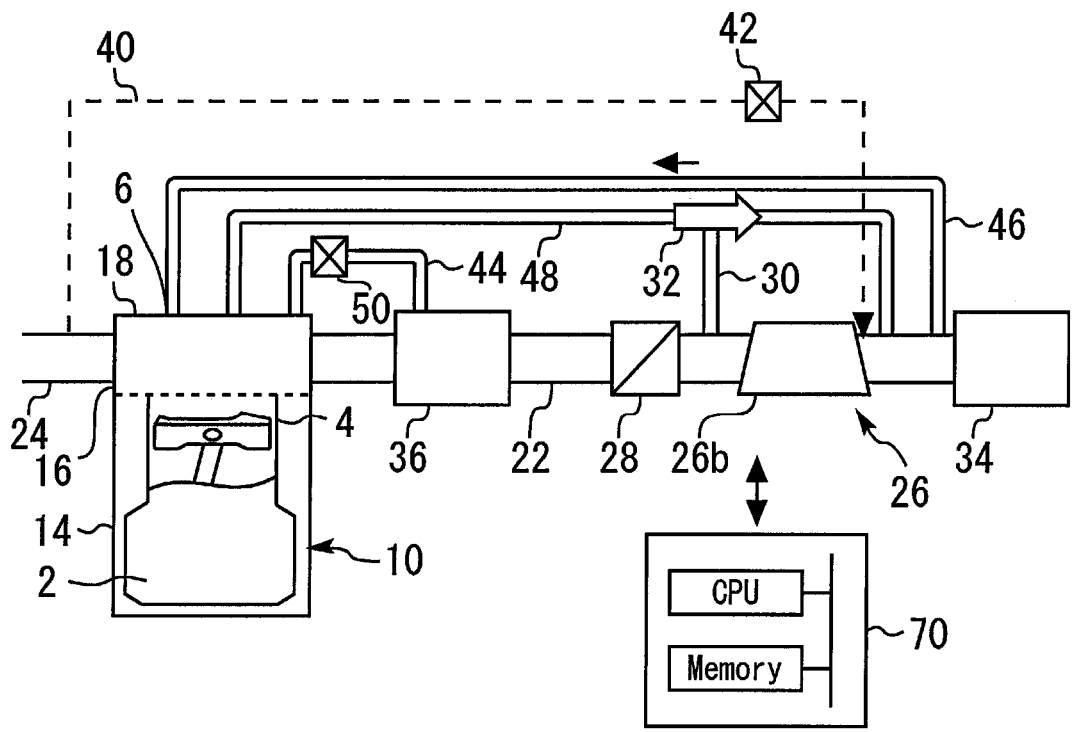
FIG. 1 is a diagram illustrating a system configuration of one or more embodiments.

Hereinafter, one or more embodiments of the present disclosure will be described with reference to the drawings.
1-1. System Configuration
FIG. 1 is a diagram illustrating a system configuration of one or more embodiments. As illustrated in FIG. 1, a system of at least one embodiment includes an engine 10 as an internal combustion engine. The number of cylinders and cylinder disposition of the engine 10 are not specially limited. The engine 10 includes a cylinder block 14 including a cylinder 4 having a piston (not illustrated) inside. Inside the cylinder block 14, a crankcase 2 is formed. A cylinder head 16 is assembled to an upper portion of the cylinder block 14. The cylinder head 16 is covered with a cylinder head cover 18. A space from a piston top surface to the cylinder head 16 forms a combustion chamber (not illustrated). The cylinder head 16 includes an intake passage 22 communicating with the combustion chamber, and an exhaust passage 24.

Further, the system of at least one embodiment includes a turbocharger 26. The turbocharger 26 includes a turbine (not illustrated) that is provided in the exhaust passage 24, and a compressor 26b that is provided in the intake passage 22. The turbine and the compressor 26b are connected to each other. At a time of operation of the turbocharger 26, the compressor 26b is driven by the turbine that rotates by receiving exhaust gas pressure, and intake air is compressed and turbocharged by the compressor 26b.

An electronically controlled throttle valve 28 is provided in the intake passage 22 at a downstream side from the compressor 26b. Further, in the intake passage 22, a bypass passage 30 that bypasses the compressor 26b is provided. In the bypass passage 30, an ejector 32 for introducing gas in a PCV passage 48 that will be described later into the bypass passage 30 is provided. Further, an air cleaner 34 is provided in the intake passage 22 at an upstream side from the compressor 26b. Further, an intake manifold 36 is provided in the intake passage 22 at a downstream side from the throttle valve 28.

Further, the system of at least one embodiment includes an EGR device that recirculates exhaust gas to the intake passage 22 from the exhaust passage 24. The EGR device includes an EGR passage 40 that connects the exhaust passage 24 at an upstream side from the turbine, and the intake passage 22 at an upstream side from the compressor 26b. On the EGR passage 40, an EGR valve 42 that adjusts an opening degree (a valve lift amount) of the EGR passage 40 is provided.

Further, the system of at least one embodiment includes three kinds of PCV (Positive Crankcase Ventilation) passages 44, 46 and 48 for ventilating an inside of the crankcase 2 with fresh air by returning blow-by gas to the intake passage 22. Blow-by gas refers to gas that flows into the crankcase 2 from a clearance of the piston and a cylinder wall surface, and is gas containing $CO_2$, NOx, oil mist and the like. The PCV passage 44 connects the cylinder head cover 18 and the intake manifold 36. On the PCV passage 44, an electrically-driven PCV valve 50 for adjusting an opening degree of the PCV passage 44 is provided. The PCV passage 46 connects a fresh air introduction port 6 that communicates with the inside of the crankcase 2 from the cylinder head cover 18, and the intake passage 22 at the upstream side from the compressor 26b. The PCV passage 48 connects an intake port of the ejector 32 and the cylinder head cover 18.

In addition, the system of at least one embodiment includes an ECU (Electronic Control Unit) 70. The ECU 70 includes at least an input/output interface, a memory and a CPU (Central Processing Unit, also referred to as a central processing device, a processing device, an arithmetic operation device, a microprocessor, a microcomputer, a processor, a processing circuitry and/or a digital signal processor (DSP)). The input/output interface is provided to take in sensor signals from various sensors attached to the internal combustion engine, and output operation signals to actuators included in the internal combustion engine. The sensors the signals of which are taken in by the ECU 70 include various sensors to control the engine 10, such as a crank angle sensor that detects an engine speed, a throttle opening degree sensor that detects an opening degree of the throttle valve 28, an accelerator position sensor that detects an operation amount of an accelerator pedal, a sensor that detects a pressure Pb and a temperature Tb of the intake manifold 36, an air flow meter that detects an intake air amount Ga, a sensor that detects a temperature T1 and a pressure P1 at the upstream side of the compressor 26b, and a pressure sensor that detects a crankcase internal pressure Pcr. Actuators to which the ECU issues operation signals include various actuators such as the PCV valve 50, the EGR valve 42 and the throttle valve 28. In the memory, various control programs for controlling the internal combustion engine, maps and the like are stored. The CPU (the processor) reads the control programs or the like from the memory, executes the control programs or the like and generates operation signals based on the sensor signals which are taken in. Respective functions of the ECU 70 are realized by a processing circuitry, e.g., the CPU in one or more embodiments. The respective functions of the ECU 30 are realized by software, firmware, or a combination of software and firmware. The software and the firmware are described as programs, and are stored in the memory. The processing circuitry realizes the functions of the respective sections by reading the programs stored in the memory and executing the programs, and/or by specifically configured hardware one or more application specific integrated circuits (ASICs)) included in the processing circuitry. Here, a nonvolatile or volatile semiconductor memory such as a RAM, a ROM, a flash memory, an EPROM, or an EPPROM corresponds to the memory.

1-2. System Operation

Next, an operation of the system of one or more embodiments of the present disclosure will be described.

1-2-1. Ventilation Operation in Crankcase

The system of at least one embodiment has a configuration for ventilating the inside of the crankcase 2 with fresh air by controlling the PCV valve 50. As illustrated in FIG. 1, the PCV valve 50 is interposed between the crankcase 2 of the engine 10 and the intake passage 22. Consequently, when the PCV valve 50 is opened in a non-turbocharging region where a negative pressure is generated in the intake manifold 36, blow-by gas in the crankcase 2 is sucked into the intake passage 22. Further, when the blow-by gas is sucked into the intake passage 22, fresh air is drawn into the crankcase 2 via the PCV passage 46 by the negative pressure that is generated in the crankcase 2. Thereby, the inside of the crankcase 2 is ventilated with fresh air.

Figure 2:
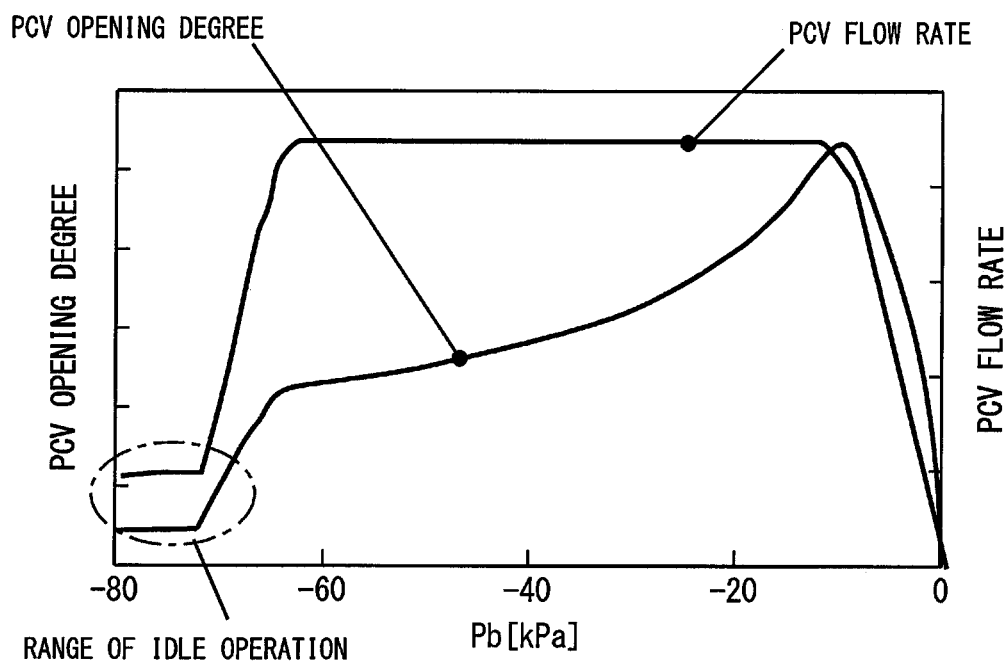
FIG. 2 is a diagram illustrating one example of a base map for determining a PCV opening degree.

In the system of at least one embodiment, normal control of adjusting a PCV opening degree based on an intake manifold pressure Pb is performed. In the normal control, the PCV opening degree is determined in accordance with a base map as follows, for example. FIG. 2 is a diagram illustrating an example of the base map for determining the PCV opening degree. In the base map illustrated in FIG. 2, a PCV flow rate and the PCV opening degree are respectively related with the intake manifold pressure Pb. In a range where the intake manifold pressure Pb is in a vicinity of the atmospheric pressure, a flow rate of blow-by gas (herein, "PCV flow rate") that passes through the PCV valve 50 cannot be ensured, and there is also a risk of a back flow, so that the PCV opening degree is set at full closure. Further, in a range where the negative pressure of the intake manifold 36 is ensured, the PCV flow rate is set at a predetermined large flow rate in order to promote ventilation of the inside of the crankcase 2. An upper limit of the PCV flow rate in this range is determined with consideration given to restraint of an amount of oil taken away, an influence on an air-fuel ratio and the like. Further, in a range of an idle operation (a no-load operation) where the negative pressure of the intake manifold 36 becomes the largest, the PCV flow rate is set at a predetermined low flow rate with consideration given to idling stability, and restraint of the amount of oil taken away. According to the normal control using the map like this, the inside of the crankcase 2 can be ventilated with fresh air while oil taken away and the influence on the air-fuel ratio are restrained in the non-turbocharging region.

Figure 3:
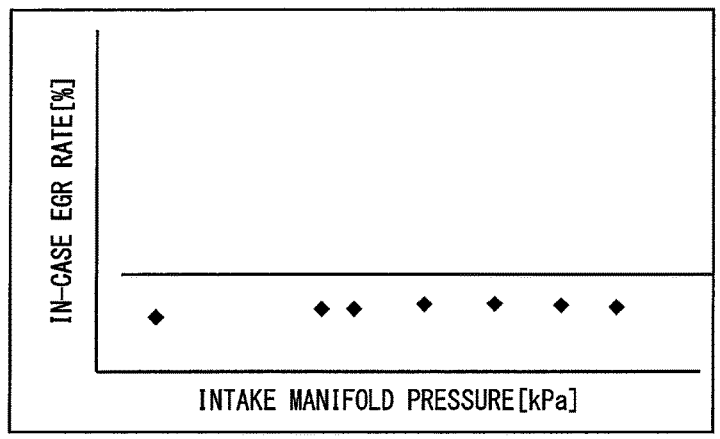
FIG. 3 is a diagram illustrating an in-case EGR rate with respect to an intake manifold pressure Pb.

Further, the system of at least one embodiment has a configuration for ventilating the inside of the crankcase 2 with fresh air by using the ejector 32. As illustrated in FIG. 1, the ejector 32 has an inlet that leads into the crankcase 2 via the PCV passage 48, an outlet that leads to the upstream side of the compressor 26b via the bypass passage 30, and a pressure introduction port that leads to the downstream side of the compressor 26b via the bypass passage 30. In the turbocharging region, a pressure difference occurs before and behind the compressor 26b. At this time, a flow of air from the pressure introduction port to the outlet occurs inside the ejector 32. When the flow of air like this occurs, the ejector 32 causes blow-by gas in the crankcase 2 to flow out from the outlet. Further, when the blow-by gas is sucked from the inside of the crankcase 2, fresh air is sucked into the crankcase 2 via the PCV passage 46 by a negative pressure that is generated in the crankcase 2. According to the ejector 32, the inside of the crankcase 2 can be ventilated with fresh air in the turbocharging region. FIG. 3 is a diagram (which is, for example, prepared/determined in advance by experiments) illustrating an in-case EGR rate with respect to the intake manifold pressure Pb. The in-case EGR rate mentioned here refers to a ratio of exhaust gas ($CO_2$, for example) that is contained in the blow-by gas in the crankcase 2. As above, the system of at least one embodiment can ventilate the inside of the crankcase 2 with fresh air even in the state of either the turbocharging region or the non-turbocharging region, and therefore, it is understandable that the in-case EGR rate is kept at a low value that is a fixed value or less, irrespective of the intake manifold pressure Pb.

1-2-2. Deceleration Misfire at EGR Introduction Time

In EGR control, an actuator such as the EGR valve 42 is operated by feedback control so that an actual EGR rate or a state quantity having a correlation with the actual EGR rate becomes a target EGR rate.

Here, when a deceleration request (a sudden torque reduction request, for example) is received in a case where the EGR gas is introduced, the throttle opening degree is decreased by adjusting the throttle valve 28. When the throttle opening degree is abruptly reduced, a charge efficiency is reduced. In an operation region where the charge efficiency is low, the EGR rate corresponding to a combustion limit is low, and therefore the target EGR rate is decreased. However, even when the target EGR rate is reduced and the opening degree (a valve lift amount) of the EGR valve 42 is decreased, the actual EGR rate in the cylinder 4 does not change immediately. This is because a transport delay occurs, which corresponds to a capacity of the intake path to the inside of the cylinder 4 from the EGR gas introduction port (e.g., connection point) of the EGR passage 40 to the intake passage 22. When air with a higher EGR rate than the target EGR rate is taken into the cylinder 4 due to the transport delay of the EGR gas, the EGR rate becomes larger than a misfire limit EGR rate, and a misfire and an engine stall are likely to occur.

1-3. Characteristic Operation

In order to enhance ignitability at the time of EGR gas introduction, it is effective to reduce the actual EGR rate in the cylinder 4. Here, as described above, the blow-by gas in the crankcase 2 has the in-case EGR rate kept at a low value.

Therefore, in the system of at least one embodiment, at a time of deceleration of the engine 10 where a deceleration request is received, the opening degree of the PCV valve 50 (herein, referred to as "PCV opening degree") in a time period from the deceleration request is received is adjusted, based on an EGR rate (hereinafter, referred to as "immediately preceding EGR rate") immediately before the deceleration request is received. In more detail, a case where the immediately preceding EGR rate is 0% when the deceleration request to the engine 10 is issued means that EGR introduction is not performed immediately before deceleration. In this case, the PCV valve 50 has the opening degree adjusted by the normal control that adjusts the PCV opening degree based on the present intake manifold pressure Pb as described with respect to FIG. 2.

Meanwhile, a case where the immediately preceding EGR rate is larger than 0% when the deceleration request to the engine 10 is issued means that EGR introduction is performed immediately before deceleration. In this case, a transport delay of the EGR gas occurs, and therefore, opening degree increasing control that controls the PCV opening degree in the time period from the deceleration request is received to an opening degree that is larger than in the above described normal control is executed.

Figure 4:
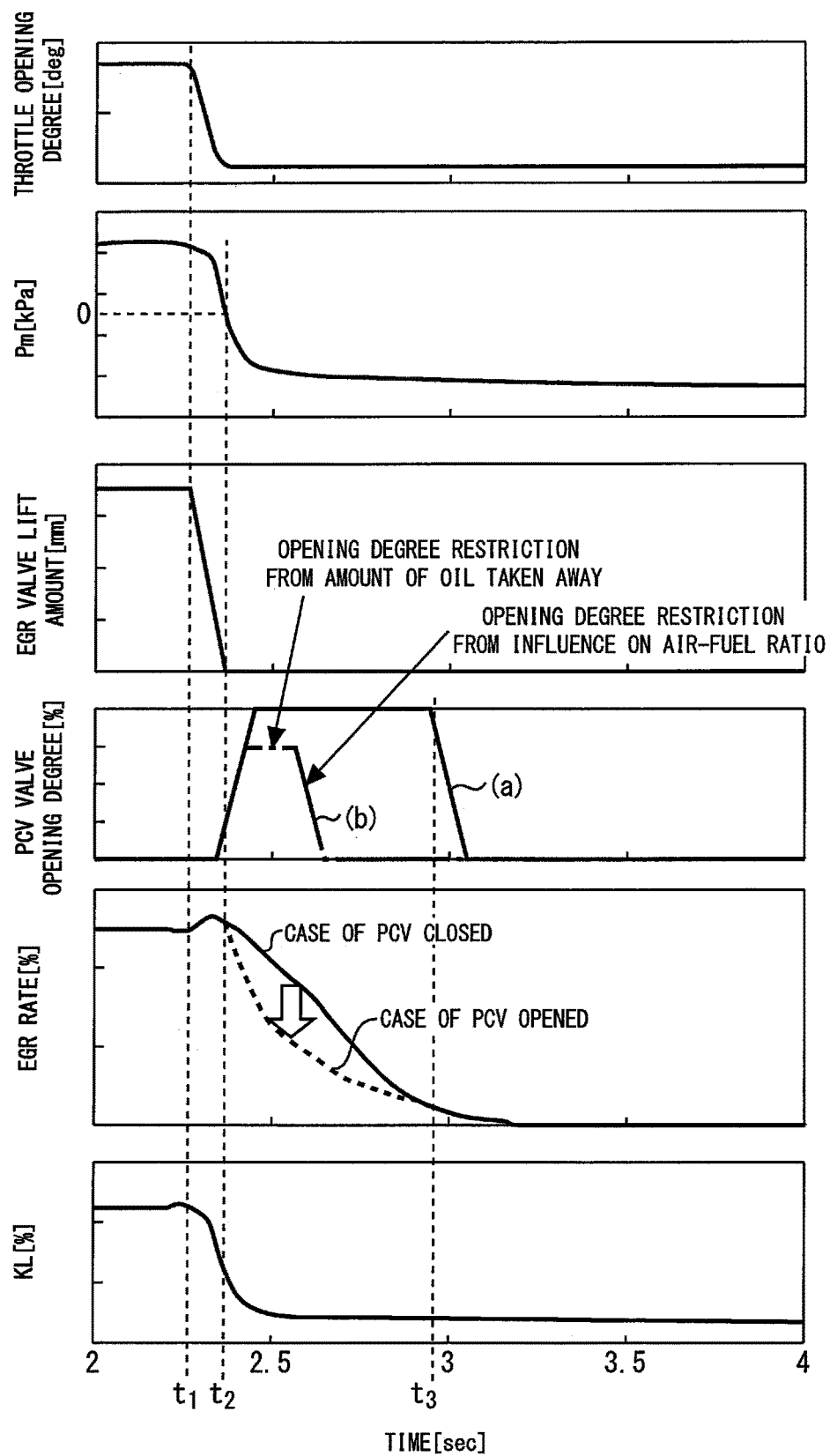
FIG. 4 is a time chart illustrating changes of various state quantities in a deceleration time of an engine of one or more embodiments.

FIG. 4 is a time chart illustrating changes of various state quantities in the deceleration time of the engine 10. As illustrated in FIG. 4, when deceleration is started and the opening degree of the throttle valve 28 is operated to a closing side at a time point t1 at which the EGR gas is introduced, the EGR valve opening degree (the valve lift amount) is operated to a closing side (full closure). At this time, in the opening degree increasing control illustrated by (a) in FIG. 4, the opening degree of the PCV valve 50 is operated to an opening degree that is larger than in the normal control illustrated by (b) in FIG. 4, at a time point t2 when the intake manifold pressure Pb becomes smaller than the atmospheric pressure (that is, the intake manifold pressure Pb becomes a negative pressure). As a result, a larger amount of blow-by gas than at the time of normal control is sucked into the intake manifold 36. Since the blow-by gas in the crankcase 2 has the EGR rate kept to be low, the EGR gas with a transport delay is diluted by the blow-by gas before being taken into the cylinder 4. Thereby, the actual EGR rate in the cylinder 4 is reduced more than during the normal control and in the case where the PCV valve 50 is closed, and therefore, occurrence of a misfire and an engine stall at the time of deceleration is restrained.

When the EGR gas with a transport delay in the intake path is completely scavenged, the EGR rate in the cylinder 4 is prevented from becoming higher than the target EGR rate. Therefore, in the system of at least one embodiment, the PCV opening degree is returned to an opening degree by the normal control at a time point t3 at which the time period until the EGR gas with a transport delay is scavenged elapses. As for the time period until the EGR gas with a transport delay is completely scavenged from the deceleration request is received, a time period until an integral capacity (hereinafter, referred to as "integral in-cylinder inflow gas capacity Vsum") of an in-cylinder inflow air amount from the EGR valve 42 is fully closed becomes larger than an intake path capacity Vth from the EGR gas introduction port in the intake passage 22 to the inside of the cylinder 4 can be used. Thereby, it becomes possible to restrain oil from being taken away and restrain an influence on the air-fuel ratio by the inside of the crankcase 2 being ventilated more than necessary.

Further, since the EGR rate of the EGR gas with a transport delay becomes higher as the immediately preceding EGR rate is larger, a possibility of a misfire also becomes high. Thus, the PCV opening degree in the opening degree increasing control is determined in accordance with the immediately preceding EGR rate. As the configuration like this, a configuration of performing control so that the PCV opening degree becomes larger as the immediately preceding EGR rate is larger is within the scope of one or more embodiments, for example. Further, if the highest priority is given to misfire avoidance at the time of deceleration of the engine 10, the PCV opening degree is controlled to full opening in the opening degree increasing control, for example.

1-4. Specific Processing

Figure 5:
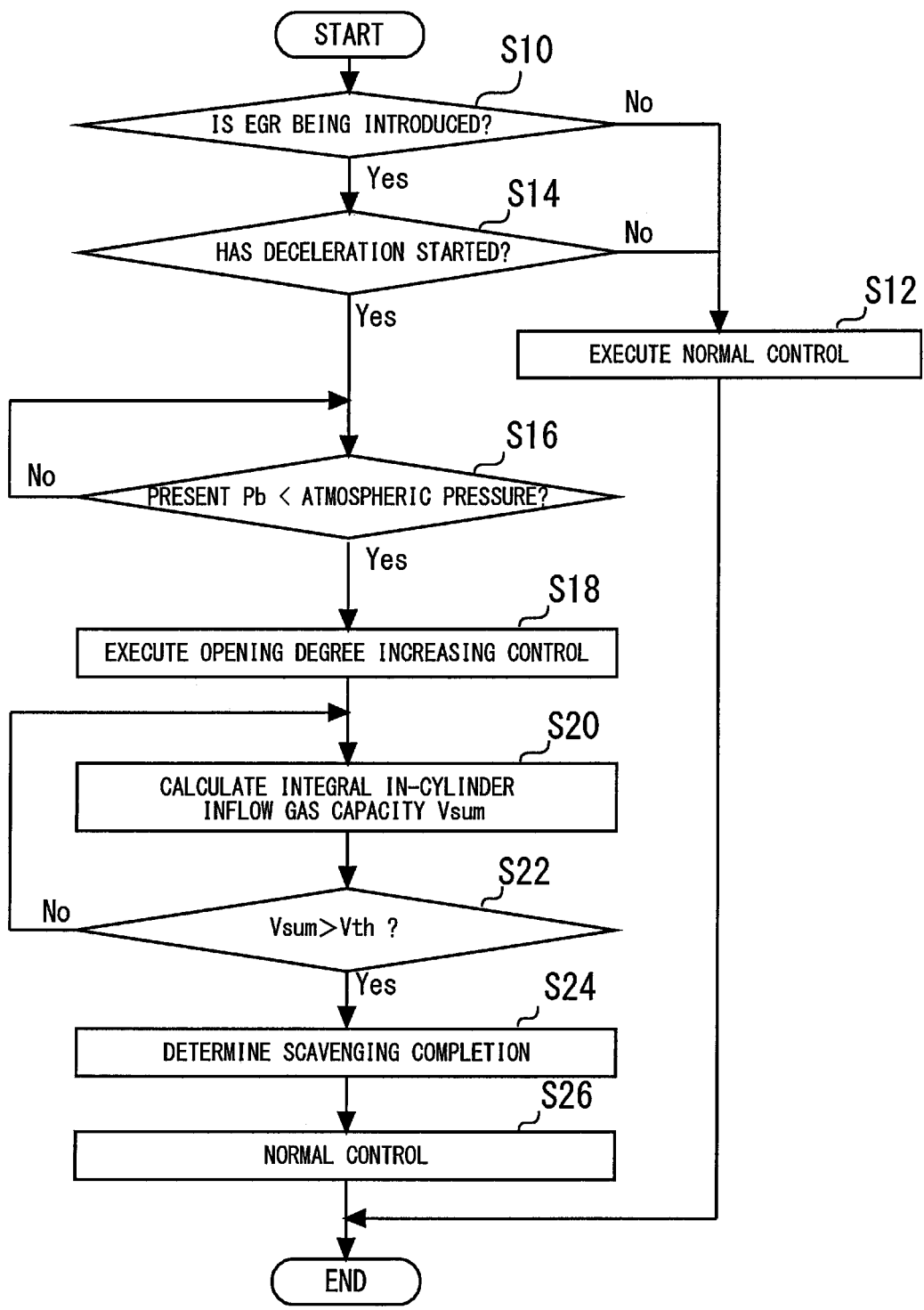
FIG. 5 is a flowchart of a routine executed by a system of one or more embodiments.

Next, specific processing executed in the system of one or more embodiments will be described. FIG. 5 is a flowchart of a routine executed by the system of one or more embodiments. The routine illustrated in FIG. 5 is repeatedly executed by the ECU 70 during an operation of the engine 10.

In the routine illustrated in FIG. 5, it is determined whether or not EGR is being introduced first (step S10). When EGR is not being introduced, it is determined that a transport delay of the EGR gas at a time of deceleration does not occur, and the flow shifts to step S12 as follows. In step S12, normal control that adjusts the PCV opening degree in accordance with the map as illustrated in FIG. 2 is executed (step S12).

When it is determined that EGR is being introduced in step S10 described above, it is determined that a transport delay of the EGR gas at the time of deceleration occurs, and the flow shifts to step S14 as follows. In step S14, it is determined whether or not deceleration of the engine 10 is started (step S14). Deceleration that is a target of the determination here is such deceleration that operates the throttle valve 28 to the closing side and operates the EGR valve 42 to full closure, and, for example, abrupt deceleration from the turbocharging region corresponds to the deceleration. When it is determined that deceleration of the engine 10 is not started, it is determined that the transport delay of the EGR gas at the time of deceleration does not occur, the flow shifts to step S12 described above, and the normal control is executed.

Meanwhile, when it is determined that deceleration of the engine 10 is started in step S14 described above, it is determined that the transport delay of the EGR gas at the time of deceleration occurs, the flow shifts to the next step, and it is determined whether or not the present intake manifold pressure Pb (hereinafter, referred to as "present Pb") becomes smaller than atmospheric pressure (step S16). When establishment of present Pb<atmospheric pressure is not recognized, the blow-by gas is not sucked into the intake manifold 36 even when the PCV valve 50 is opened, and therefore, processing of the present step is repeatedly executed until establishment of present Pb<atmospheric pressure is recognized.

When establishment of present Pb<atmospheric pressure is recognized in step S16, the flow shifts to the next step, and the PCV valve 50 is operated to a larger opening degree than in the normal control (step S18). Next, the integral in-cylinder inflow gas capacity Vsum is calculated (step S20). Here, the integral in-cylinder inflow gas capacity Vsum is calculated by adding a predetermined time delay to an integral value of the intake gas capacity that is calculated from the intake air amount Ga detected by the air flow meter and the temperature T1 upstream of the compressor 26*b* detected by the temperature sensor. Next, it is determined whether or not the calculated integral in-cylinder inflow gas capacity Vsum is larger than the predetermined intake path capacity Vth (step s22). The predetermined intake path capacity Vth is a capacity of the intake path from the EGR gas introduction portion of the EGR passage 40 in the intake passage 22 to the cylinder 4, and a design value set in advance is used. When establishment of Vsum>Vth is not recognized, it is determined that the EGR gas with a transport delay is not scavenged from the intake path, and the flow shifts again to the processing in step S20 described above. Meanwhile, when establishment of Vsum>Vth is recognized, it is determined that the EGR gas with a transport delay is scavenged from the intake path, the flow shifts to the next step, scavenging completion of the intake path is determined (step S24), and the flow is returned to the normal control of the PCV valve 50 (step S26).

As described above, according to the system of one or more embodiments, it becomes possible to restrain occurrence of a misfire and an engine stall due to a transport delay of the EGR gas in deceleration under introduction of the EGR gas.

Although in the aforementioned one or more embodiments, the example of applying the present disclosure to the system that executes so-called low pressure EGR that introduces EGR gas to an upstream side of the compressor 26*b* is explained, the present disclosure is applied in one or more embodiments to a system that executes so-called high pressure EGR that introduces EGR gas to the downstream side of the compressor 26*b*. This is similarly applies to a system of one or more embodiments that will be described later.

Further, although in the system of the aforementioned one or more embodiments, the configuration that calculates the integral in-cylinder inflow gas amount by using the intake air amount Ga detected by the air flow meter is adopted, a configuration that calculates the integral in-cylinder inflow gas amount by using an air model that models an intake system may be adopted. This similarly applies to the system of one or more embodiments which will be described later.

Further, although in the system of the aforementioned one or more embodiments, in the opening degree increasing control, the PCV opening degree is controlled to an opening degree that is larger than the opening degree in the normal control, a configuration may be adopted, which calculates the PCV opening degree for preventing a misfire at the time of deceleration by a PCV opening degree calculating section that will be described as follows.

Figure 6:
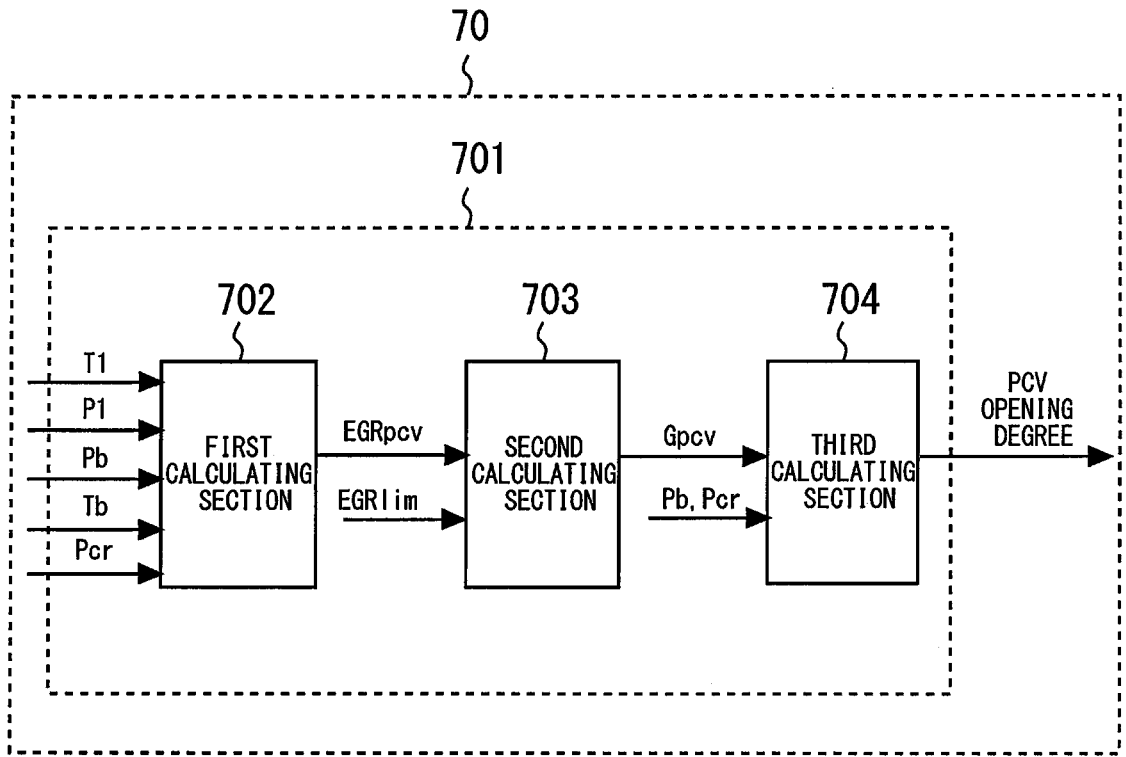
FIG. 6 is a functional block diagram illustrating a configuration of a PCV opening degree calculating section.

FIG. 6 is a functional block diagram illustrating a configuration of a PCV opening degree calculating section 701. The PCV opening degree calculating section 701 is configured by three calculating sections 702, 703 and 704. The PCV opening degree calculating section 701 is a part of a processing circuitry of the ECU 70, and is for realizing a function for calculating the PCV opening degree for preventing a misfire at the time of deceleration.

The first calculating section 702 calculates an in-case EGR rate EGRpcv. Here, by using a relation shown in expression (1) as follows, a PCV flow rate Qpcv flowing in the PCV passage 44, and a fresh air flow rate Qair flowing in the PCV passage 46 are calculated, and a blow-by flow rate Qblow (=Qpcv−Qair) flowing into the crankcase 2 is calculated. In expression (1), P1 represents a pressure upstream of the compressor 26*b*, Pcr represents a crankcase internal pressure Pcr, $\rho_{pcv}$, represents an fluid density (kg/m$^3$) that is calculated using the crankcase internal pressure Pcr and the temperature Tcr, $\rho_{air}$ represents an fluid density (kg/m$^3$) that is calculated using the pressure P1 and the temperature T1 upstream of the compressor 26*b*, Apcv represents cross-sectional area of the PCV passage 44, Aair represents cross-sectional area of the PCV passage 46, and $\alpha_{pcv}$ and $\alpha_{pcv}$ represent orifice flow coefficients. Next, the blow-by gas is approximated as EGR gas with 100% exhaust gas, and the in-case EGR rate EGRpcv is calculated by using the blow-by flow rate Qblow. Note that the in-case EGR rate may be calculated by adaptation with a variation taken into consideration.

$$Qpcv = \alpha_{pcv} A_{pcv} \sqrt{\frac{2(Pb - Pcr)}{\rho_{pcv}}} \quad (1)$$

$$Qair = \alpha_{air} A_{air} \sqrt{\frac{2(Pcr - P1)}{\rho_{air}}}$$

The second calculating section 703 calculates a requested value Gpcv of the PCV flow rate for the actual EGR rate in the combustion chamber to be smaller than the misfire limit EGR rate. Here, by using a relation shown in expression (2) as follows, the requested value Gpcv of the PCV flow rate that is taken into the cylinder 4 is calculated. In expression (2), Gcyl represents an air amount (10 g/s, for example) that is taken into the cylinder 4, EGRcyl represents an EGR rate (that is, the immediately preceding EGR rate) in the intake passage 22, and EGRlim represents a misfire limit EGR rate, respectively.

$$\frac{EGRcyl \times Gcyl + EGRpcv \times Gpcv}{Gcyl + Gpcv} < EGR\lim \quad (2)$$

Figure 7:
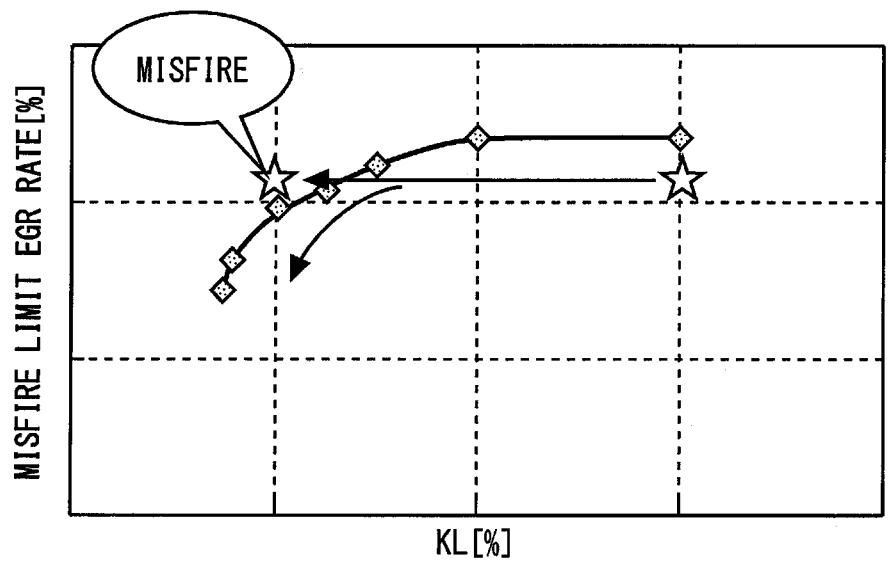
FIG. 7 is a diagram illustrating a misfire limit EGR rate with respect to an engine load KL.

According to expression (2) described above, Gpcv>12.5 g/s is derived where Gcyl=10 g/s, EGRpcv=3%, EGRcyl=20%, and EGRlim=10%. Note that the misfire limit EGR rate EGRlim changes in accordance with an engine load KL. FIG. 7 is a diagram (which is, for example, prepared/determined in advance by experiments) illustrating the misfire limit EGR rate with respect to the engine load KL. As illustrated in FIG. 7, the misfire limit EGR rate EGRlim reduces more as the engine load KL becomes smaller. Thus, the second calculating section 703 calculates the requested value Gpcv of the PCV flow rate by using expression (2) described above with respect to each of the engine loads KL during deceleration of the engine 10.

The third calculating section 704 calculates a minimum PCV opening degree for realizing each requested value Gpcv calculated in the second calculating section 703, by using a difference in pressure between the intake manifold pressure Pb and the crankcase internal pressure Pcr. Subsequently, a maximum value of the calculated minimum PCV opening degrees is set as a final PCV opening degree (a requested opening degree) in the opening degree increasing control.

According to setting of the PCV opening degree like this, the PCV opening degree is set at the requested opening degree, which is a minimum PCV opening degree with which a misfire does not occur at the time of deceleration, and therefore it becomes possible to avoid occurrence of a misfire reliably while oil taken away and the influence on the air-fuel ratio are restrained to a minimum. This similarly applies to the system of one or more embodiments that will be described later.

In one or more embodiments, the ECU 70 corresponds to a "processing circuitry", the PCV passage 44 corresponds to a "first PCV passage", and the PCV passage 48 corresponds to a "second PCV passage". Further, in one or more embodiments, the ECU 70 executes the processing in the step S12 or S18 described above, whereby "opening degree control circuitry" is realized, the ECU 70 executes the processing in step S12 described above, whereby "first control circuitry" is realized, and the ECU 70 executes the processing in step S18 described above, whereby "second control circuitry" is realized.

Figure 8:
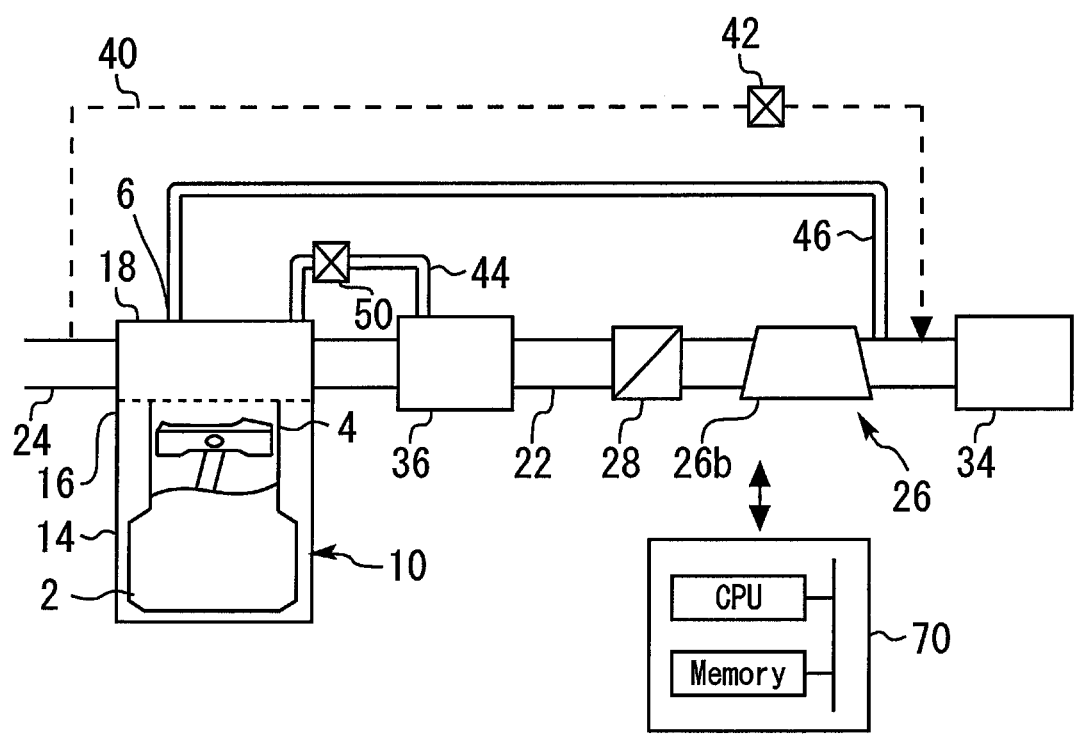
FIG. 8 is a diagram illustrating a system configuration of one or more embodiments.

FIG. 8 is a diagram illustrating a system configuration of one or more embodiments. As illustrated in FIG. 8, the system of FIG. 8, in one or more embodiments, includes a similar hardware configuration to that described with respect to FIG. 1 except that the system of FIG. 8 does not include the bypass passage 30, the PCV passage 48 and the ejector 32.

The system of FIG. 8, in one or more embodiments, has a configuration for ventilating the inside of the crank case 2 with fresh air by controlling the PCV valve 50. Specifically, in the system of FIG. 8, in one or more embodiments, normal control similar to that described with respect to FIGS. 1-7 is performed. In the normal control, in accordance with the map illustrated in FIG. 2, the PCV opening degree is fully closed in the turbocharging region where the intake manifold pressure Pb is a positive pressure, and the PCV opening degree is adjusted to the PCV opening degree corresponding to the pressure Pb in the non-turbocharging region where the intake manifold pressure Pb is a negative pressure. Thereby, a back flow of the blow-by gas in the turbocharging region is restrained, and the inside of the crankcase 2 is ventilated with fresh air in the non-turbocharging region.

Here, the system of FIG. 8, in at least one embodiment, does not have the ejector in FIG. 1. Therefore, the inside of the crankcase 2 is not ventilated with fresh air in the turbocharging region, and there is no guarantee that the in-case EGR rate is kept at a low value that is a fixed value or less. That is, while the engine 10 is operated in the non-turbocharging region, the inside of the crankcase 2 is ventilated with fresh air by normal control, and therefore the in-case EGR rate is kept at a low value. While the engine 10 is operated in the turbocharging region, the inside of the crankcase 2 is not ventilated with fresh air, and therefore, the in-case EGR rate increases to a high value. In this way, the in-case EGR rate differs depending on whether the engine 10 is operated in the turbocharging region or operated in the non-turbocharging region. Consequently, when deceleration from the turbocharging region is performed during introduction of the EGR gas, the EGR rate of the EGR gas with a transport delay becomes higher due to recirculation of the blow-by gas with a high EGR rate, and a misfire is likely to be caused.

Thus, in the system of FIG. 8 in at least one embodiment, in the case where the operation of the engine shifts to the non-turbocharging region by deceleration from the turbocharging region, opening degree restriction control that restricts the PCV opening degree to a smaller opening degree than the opening degree at the time of normal control is executed. The PCV opening degree in the opening degree restriction control is an opening degree that is smaller than the opening degree at the time of normal control, and, in an example configuration, is kept at full closure.

Figure 9:
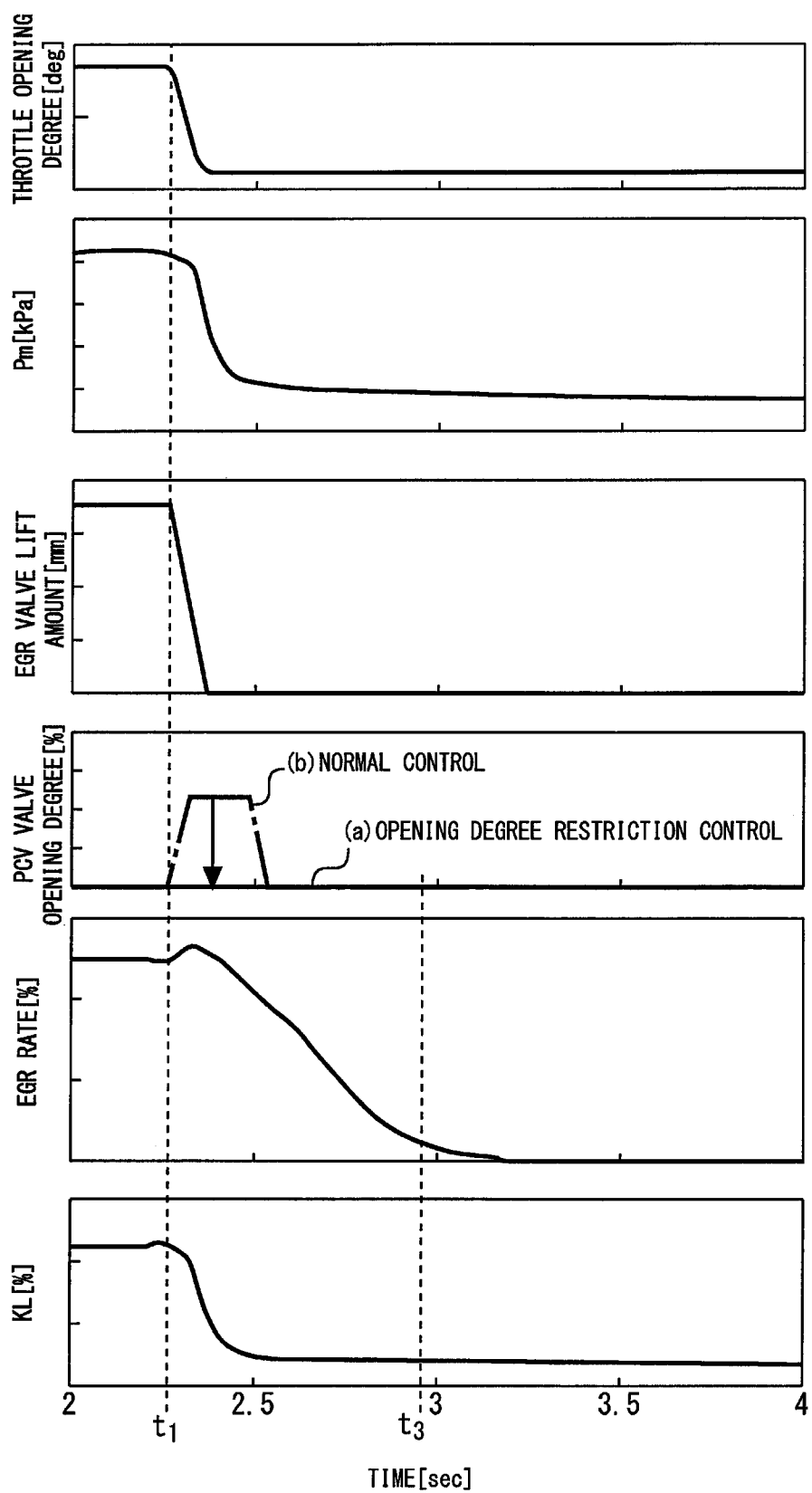
FIG. 9 is a time chart illustrating changes of various state quantities in a deceleration time of an engine of one or more embodiments.

FIG. 9 is a time chart illustrating changes of various state quantities in the time of deceleration of the engine 10. As illustrated in FIG. 9, when deceleration is started and the opening degree of the throttle valve 28 is operated to a closing side at the time point t1 at which the EGR gas is being introduced, the EGR valve opening degree (the valve lift amount) is operated to the closing side (full closure). At this time, in the normal control of a comparative example illustrated by (b), valve opening of the PCV valve 50 is performed for the purpose of restraining oil deterioration or the like. In contrast with this, in the opening degree restriction control of the system of one or more embodiments illustrated by (a), full closure of the PCV valve 50 is continued when the EGR valve opening degree (the valve lift amount) is operated to the closing side (full closure). While the engine 10 is operated in the turbocharging region, the blow-by gas in the crankcase 2 is kept at a high EGR rate. Full closure of the PCV valve 50 is continued, whereby the blow-by gas is prevented from being sucked into the intake manifold 36. Thereby, further increase of the EGR rate of the EGR gas with a transport delay is avoided, and therefore, occurrence of a misfire and an engine stall in the time of deceleration is restrained.

When the EGR gas with a transport delay in the intake path is completely scavenged, the EGR rate in the cylinder 4 is prevented from becoming higher than the target EGR rate. Thus, at the time point t3 at which the EGR gas with a transport delay is scavenged, the PCV opening degree is returned to the opening degree by normal control. As for a time period until the EGR gas with a transport delay is scavenged from a deceleration request is received, a time period until the integral in-cylinder inflow gas capacity Vsum becomes larger than the intake path capacity Vth from the EGR valve 42 is closed can be used, as with the system of one or more embodiments. Thereby, it becomes possible to restart ventilation of the inside of the crankcase 2 early.

While the engine 10 is operated in the non-turbocharging region, the blow-by gas in the crankcase 2 is kept at a low EGR rate. Consequently, in the deceleration from the non-turbocharging region, there is no need to execute the opening degree restriction control. Thus, in the system of FIG. 8 in at least one embodiment, in the case where deceleration is performed from the non-turbocharging region during introduction of the EGR gas, opening degree increasing control similar to that described with respect to FIGS. 1-7 is executed. According to the opening degree increasing control, the EGR gas with a transport delay is diluted by the blow-by gas before the EGR gas is taken into the cylinder 4. Thereby, the actual EGR rate in the cylinder 4 can be reduced, and therefore occurrence of a misfire and an engine stall at the time of deceleration can be restrained.

Figure 10:
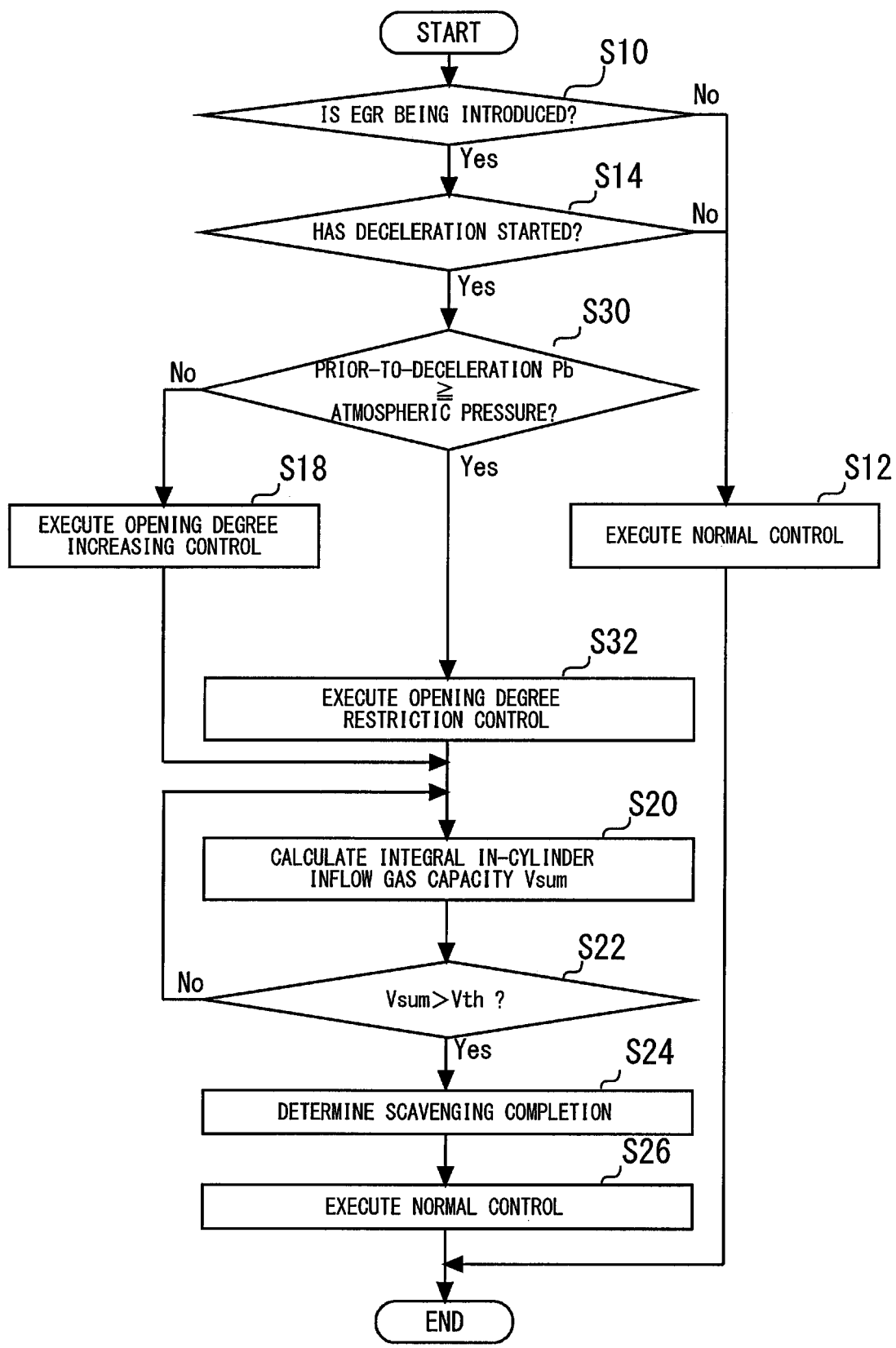
FIG. 10 is a flowchart of a routine executed by a system of one or more embodiments.

FIG. 10 is a flowchart of a routine executed by the system of FIG. 8 in one or more embodiments. The routine illustrated in FIG. 10 is repeatedly executed by the ECU 70 during an operation of the engine 10.

In steps S10, S12 and S14 of the routine illustrated in FIG. 10, processing similar to the processing in S10, S12 and S14 of the routine illustrated in FIG. 5 is executed. When it is determined that deceleration of the engine 10 is started as a result of the processing in step S14, it is determined that a transport delay of the EGR gas at the time of deceleration occurs, the flow shifts to the next step, and it is determined whether or not the intake manifold pressure Pb (hereinafter, prior-to-deceleration Pb) immediately before deceleration is the atmospheric pressure or more (step S30). When establishment of the prior-to-deceleration Pb atmospheric pressure is not recognized, it is determined that the operation before deceleration is in the non-turbocharging region and the PCV valve 50 is opened. In this case, it is determined that the in-case EGR rate is kept at a value lower than the immediately preceding EGR rate, and therefore, processing for performing the PCV opening degree increasing control is performed. Specifically, processing similar to S16 and S18 of the routine illustrated in FIG. 5 is executed.

When establishment of the prior-to-deceleration Pb≥atmospheric pressure is recognized as a result of the processing in step S30, it is determined that the operation before deceleration is in the turbocharging region, and the PCV valve 50 is closed. In this case, it is determined that the in-case EGR rate increases to a higher value than the immediately preceding EGR rate, and therefore the opening degree restriction control is executed (step S32). Here, specifically, the PCV opening degree is kept at full closure.

When the processing in step S32 is executed, the flow then shifts to step S20. In steps S20 to S26, similar processing to steps S20 to S26 illustrated in FIG. 5 is executed.

As described above, according to the system of FIG. 8 in one or more embodiments, in the deceleration under introduction of the EGR gas, the PCV opening degree is kept at fill closure, when the in-case EGR rate increases to a higher value than the immediately preceding EGR rate. Thereby, increase of the EGR rate of the EGR gas with a transport delay is avoided, and therefore it becomes possible to restrain occurrence of a misfire and an engine stall.

Although in the system of FIG. 8 in one or more embodiments, the opening and closing state of the PCV valve immediately before deceleration is determined depending on whether or not the prior-to-deceleration Pb is the atmospheric pressure or more, it may be determined based on a history of PCV opening degree information such as an opening degree instruction to the PCV valve 50. Further, the opening and closing state of the PCV valve immediately before deceleration is reflected in the in-case EGR rate. Consequently, the opening and closing state of the PCV valve immediately before deceleration may be determined by calculating the in-case EGR rate by using calculation in the aforementioned first calculating section 702, and comparing whether or not the in-case EGR rate is higher than the immediately preceding EGR rate.

In one or more embodiments, the ECU 70 corresponds to a "processing circuitry", and the PCV passage 44 corresponds to a "first PCV passage". Further, in one or more embodiments, the ECU 70 executes the processing in step 32 described above, whereby "opening degree restriction control circuitry", the ECU 70 executes the processing in step S12 or S18 described above, whereby "opening degree control circuitry", the ECU 70 executes the processing in step S12 described above, whereby "first control circuitry", and the ECU 70 executes the processing in step S18 described above, whereby "second control circuitry".

What is claimed is:

1. A control device for an internal combustion engine, wherein the internal combustion engine comprises:
   a cylinder,
   an intake passage connected to the cylinder,
   a throttle valve configured to adjust an amount of air flowing into the cylinder through the intake passage,
   an Exhaust Gas Recirculation (EGR) passage configured to cause exhaust gas to recirculate to the intake passage,
   an EGR valve configured to adjust an EGR rate, that is a ratio of the exhaust gas contained in the air flowing into the cylinder, by adjusting an opening degree of the EGR passage,
   a first Positive Crankcase Ventilation (PCV) passage communicating an inside of a crankcase of the internal combustion engine with the intake passage at a downstream side of the throttle valve, and a PCV valve configured to adjust an opening degree of the first PCV passage, wherein the control device is configured to operate the throttle valve in a closing direction in response to a deceleration request, and wherein the control device comprises a processing circuitry including an opening degree control circuitry configured to adjust an opening degree of the PCV valve in a time period from reception of the deceleration request, based on an immediately preceding EGR rate that is an EGR rate immediately before the reception of the deceleration request, when the throttle valve is operated in the closing direction in response to the deceleration request.

2. The control device according to claim 1,
wherein the opening degree control circuitry includes
- a first control circuitry configured to adjust the opening degree of the PCV valve, in accordance with a base map relating the opening degree of the PCV valve with a pressure in the intake passage at the downstream side of the throttle valve, when the immediately preceding EGR rate is zero, and
- a second control circuitry configured to adjust the opening degree of the PCV valve to be larger than an opening degree that is determined based on the base map, when the immediately preceding EGR rate is larger than zero.

3. The control device according to claim 1,
wherein the opening degree control circuitry is configured to increase the opening degree of the PCV valve as the immediately preceding EGR rate increases.

4. The control device according to claim 1,
wherein the opening degree control circuitry is configured to adjust the opening degree of the PCV valve to full opening, when the immediately preceding EGR rate is larger than zero.

5. The control device according to claim 1,
wherein the opening degree control circuitry is configured to
- calculate an EGR rate of blow-by gas in the crankcase,
- calculate a requested value of an introduction amount of the blow-by gas to the intake passage for the EGR rate in the cylinder to be smaller than a misfire limit EGR rate, based on the EGR rate of the blow-by gas and the immediately preceding EGR rate,
- calculate a requested opening degree of the PCV valve for realizing the requested value, based on a pressure at the downstream side of the throttle valve in the intake passage, and
- adjust the opening degree of the PCV valve to the requested opening degree, when the immediately preceding EGR rate is larger than zero.

6. A control device for an internal combustion engine,
wherein the internal combustion engine comprises:
- a cylinder,
- an intake passage connected to the cylinder,
- a throttle valve configured to adjust an amount of air flowing into the cylinder through the intake passage,
- an Exhaust Gas Recirculation (EGR) passage configured to cause exhaust gas to recirculate to the intake passage,
- an EGR valve configured to adjust an EGR rate, that is a ratio of the exhaust gas contained in the air flowing into the cylinder, by adjusting an opening degree of the EGR passage,
- a first Positive Crankcase Ventilation (PCV) passage communicating an inside of a crankcase of the internal combustion engine with the intake passage at a downstream side of the throttle valve, and
- a PCV valve configured to adjust an opening degree of the first PCV passage, wherein the control device is configured to operate the throttle valve in a closing direction in response to a deceleration request, and wherein the control device comprises a processing circuitry including an opening degree restriction control circuitry configured to restrict an opening degree of the PCV valve in a time period from reception of the deceleration request, when
- the PCV valve is closed immediately before the reception of the deceleration request, and
- the throttle valve is operated in the closing direction in response to the deceleration request.

7. The control device according to claim 6,
wherein the opening degree restriction control circuitry is configured to adjust the opening degree of the PCV valve in the time period from the reception of the deceleration request, to full closure.

8. The control device according to claim 6,
wherein the processing circuitry further includes an opening degree control circuitry configured to adjust the opening degree of the PCV valve in the time period from the reception of the deceleration request, based on the immediately preceding EGR rate, that is an EGR rate immediately before the reception of the deceleration request, when
- the PCV valve is open immediately before the reception of the deceleration request, and
- the throttle valve is operated in the closing direction in response to the deceleration request.

9. The control device according to claim 8,
wherein the opening degree control circuitry includes
- a first control circuitry configured to adjust the opening degree of the PCV valve, in accordance with a base map relating the opening degree of the PCV valve with a pressure in the intake passage at the downstream side of the throttle valve, when the immediately preceding EGR rate is zero, and
- a second control circuitry configured to adjust the opening degree of the PCV valve to be larger than an opening degree that is determined based on the base map, when the immediately preceding EGR rate is larger than zero.

10. The control device according to claim 8,
wherein the opening degree control circuitry is configured to increase the opening degree of the PCV valve as the immediately preceding EGR rate increases.

11. The control device according to claim 8,
wherein the opening degree control circuitry is configured to adjust the opening degree of the PCV valve to full opening, when the immediately preceding EGR rate is larger than zero.

12. The control device according to claim 8,
wherein the opening degree control circuitry is configured to
- calculate an EGR rate of blow-by gas in the crankcase,
- calculate a requested value of an introduction amount of the blow-by gas to the intake passage for the EGR rate in the cylinder to be smaller than a misfire limit EGR rate, based on the EGR rate of the blow-by gas and the immediately preceding EGR rate, calculate a requested opening degree of the PCV valve for realizing the requested value, based on a pressure at the downstream side of the throttle valve in the intake passage, and adjust the opening degree of the PCV valve to the requested opening degree, when the immediately preceding EGR rate is larger than zero.

13. An internal combustion engine, comprising:

a cylinder, an intake passage connected to the cylinder, a throttle valve configured to adjust an amount of air flowing into the cylinder through the intake passage, an Exhaust Gas Recirculation (EGR) passage configured to cause exhaust gas to recirculate to the intake passage, an EGR valve configured to adjust an EGR rate, that is a ratio of the exhaust gas contained in the air flowing into the cylinder, by adjusting an opening degree of the EGR passage, a first Positive Crankcase Ventilation (PCV) passage communicating an inside of a crankcase of the internal combustion engine with the intake passage at a downstream side of the throttle valve, a PCV valve configured to adjust an opening degree of the first PCV passage, and a control device, wherein the control device is configured to operate the throttle valve in a closing direction in response to a deceleration request, and wherein the control device comprises a processing circuitry including an opening degree control circuitry configured to adjust an opening degree of the PCV valve in a time period from reception of the deceleration request, based on an immediately preceding EGR rate that is an EGR rate immediately before the reception of the deceleration request, when the throttle valve is operated in the closing direction in response to the deceleration request.

14. The internal combustion engine according to claim 13, further comprising:

a compressor provided in the intake passage at an upstream side of the throttle valve, a bypass passage bypassing the compressor, a second PCV passage connecting the inside of the crankcase and the bypass passage, an ejector provided at a connection portion of the bypass passage and the second PCV passage, and configured to suck blow-by gas flowing in the second PCV passage into the bypass passage by a pressure difference between an upstream side and a downstream side of the compressor, and a fresh air introduction port communicating with the inside of the crankcase.

15. The internal combustion engine according to claim 13, wherein the processing circuitry further includes an opening degree restriction control circuitry configured to restrict the opening degree of the PCV valve in the time period from the reception of the deceleration request, when the PCV valve is closed immediately before the reception of the deceleration request, and the throttle valve is operated in the closing direction in response to the deceleration request.

16. The internal combustion engine according to claim 15, further comprising:

a fresh air introduction port configured to introduce fresh air into the crankcase.

17. The internal combustion engine according to claim 13, wherein the opening degree control circuitry includes a first control circuitry configured to adjust the opening degree of the PCV valve, in accordance with a base map relating the opening degree of the PCV valve with a pressure in the intake passage at the downstream side of the throttle valve, when the immediately preceding EGR rate is zero, and a second control circuitry configured to adjust the opening degree of the PCV valve to be larger than an opening degree that is determined based on the base map, when the immediately preceding EGR rate is larger than zero.

18. The internal combustion engine according to claim 13, wherein the opening degree control circuitry is configured to increase the opening degree of the PCV valve as the immediately preceding EGR rate increases.

19. The internal combustion engine according to claim 13, wherein the opening degree control circuitry is configured to adjust the opening degree of the PCV valve to full opening, when the immediately preceding EGR rate is larger than zero.

20. The internal combustion engine according to claim 13, wherein the opening degree control circuitry is configured to calculate an EGR rate of blow-by gas in the crankcase, calculate a requested value of an introduction amount of the blow-by gas to the intake passage for the EGR rate in the cylinder to be smaller than a misfire limit EGR rate, based on the EGR rate of the blow-by gas and the immediately preceding EGR rate, calculate a requested opening degree of the PCV valve for realizing the requested value, based on a pressure at the downstream side of the throttle valve in the intake passage, and adjust the opening degree of the PCV valve to the requested opening degree, when the immediately preceding EGR rate is larger than zero.

* * * * *